(12) United States Patent
Chang (10) Patent No.: US 11,205,969 B2
(45) Date of Patent: Dec. 21, 2021

(54) INVERTER DEVICE CONFIGURED TO OPERATE IN A CCM AND SEQUENTIALLY OPERATE IN BUCK AND BOOST PHASES

(71) Applicant: I SHOU UNIVERSITY, Kaohsiung (TW)

(72) Inventor: Chien-Hsuan Chang, Kaohsiung (TW)

(73) Assignee: I SHOU UNIVERSITY, Kaohsiung (TW)

(*) Notice: Subject to any disclaimer, the term of this patent is extended or adjusted under 35 U.S.C. 154(b) by 9 days.

(21) Appl. No.: 16/996,019

(22) Filed: Aug. 18, 2020

(65) Prior Publication Data

US 2021/0305912 A1 Sep. 30, 2021

(30) Foreign Application Priority Data

Mar. 31, 2020 (TW) .................................. 109110990

(51) Int. Cl.
*H02M 3/158* (2006.01)
*H02M 1/00* (2006.01)
*H02M 7/48* (2007.01)

(52) U.S. Cl.
CPC .......... *H02M 7/4807* (2013.01); *H02M 3/158* (2013.01); *H02M 1/007* (2021.05)

(58) Field of Classification Search
CPC ..... H02M 7/4807; H02M 1/007; H02M 3/158
See application file for complete search history.

(56) References Cited

U.S. PATENT DOCUMENTS

| | | | | |
|---|---|---|---|---|
| 5,059,887 A | * | 10/1991 | Iida | H02M 3/142 323/222 |
| 5,502,630 A | * | 3/1996 | Rokhvarg | H02M 1/4208 363/84 |
| 8,543,275 B1 | * | 9/2013 | Koga | B60L 7/14 701/22 |
| 10,186,968 B2 | * | 1/2019 | Guan | H02M 3/28 |
| 10,217,559 B2 | * | 2/2019 | Yang | H02M 7/23 |
| 2008/0074058 A1 | * | 3/2008 | Lee | H05B 45/375 315/291 |
| 2010/0054002 A1 | * | 3/2010 | Lu | H02J 9/062 363/37 |
| 2014/0119070 A1 | * | 5/2014 | Jeong | H02M 3/1584 363/45 |
| 2014/0266125 A1 | * | 9/2014 | Athalye | H05B 45/38 323/299 |

* cited by examiner

*Primary Examiner* — Sisay G Tiku
(74) *Attorney, Agent, or Firm* — Nixon & Vanderhye PC (57) ABSTRACT

An inverter device includes a converter circuit and an output circuit. The converter circuit generates a DC intermediate voltage based on a DC input voltage from a power source. The converter circuit includes: a first inductor and a first switch that are coupled in series across the power source; a second switch and a second inductor that are coupled in series across the power source; and a diode and a capacitor that are coupled in series between a common node of the first inductor and the first switch and a common node of the second switch and the second inductor. The output circuit generates an AC output voltage based on the DC intermediate voltage across the capacitor.

10 Claims, 12 Drawing Sheets

INVERTER DEVICE CONFIGURED TO OPERATE IN A CCM AND SEQUENTIALLY OPERATE IN BUCK AND BOOST PHASES

CROSS-REFERENCE TO RELATED APPLICATION

This application claims priority of Taiwanese Patent Application No. 109110990, filed on Mar. 31, 2020.

FIELD

The disclosure relates to power conversion, and more particularly to an inverter device.

BACKGROUND

A conventional inverter device is coupled between a photovoltaic module and a power grid, and converts direct current (DC) power provided by the photovoltaic module into alternating current (AC) power supplied to the power grid. The conventional inverter device includes an input capacitor, a boost DC-to-DC converter, a buck inverter and a filter. The boost DC-to-DC converter is coupled to a parallel connection of the input capacitor and the photovoltaic module to receive a DC input voltage therefrom, and converts the DC input voltage into a DC intermediate voltage. The boost DC-to-DC converter includes at least an electrolytic capacitor and a plurality of switches. The buck inverter is coupled to the boost DC-to-DC converter to receive the DC intermediate voltage therefrom, and converts the DC intermediate voltage into an AC intermediate voltage. The buck inverter includes at least a plurality of switches. The filter is coupled to the buck inverter and the power grid, is to receive the AC intermediate voltage from the buck inverter, and filters the AC intermediate voltage to generate an AC output voltage for receipt by the power grid.

However, because of two-stage power conversion (i.e., the switches of the boost DC-to-DC converter and the buck inverter constantly transition between a conduction state and a non-conduction state), the conventional inverter device has high power loss and thus low power conversion efficiency. In addition, the conventional inverter device occupies large area, and is costly and not reliable because the electrolytic capacitor thereof is bulky, expensive and not resistant to high temperature.

SUMMARY

Therefore, an object of the disclosure is to provide an inverter device that can alleviate at least one drawback of the prior art.

According to the disclosure, the inverter device includes a converter circuit and an output circuit. The converter circuit is adapted to be coupled to a power source to receive a direct current (DC) input voltage therefrom, is to further receive a first control signal and a second control signal, and generates a DC intermediate voltage based on the DC input voltage and the first and second control signals. The converter circuit includes a first inductor, a first switch, a second switch, a second inductor, a diode and a capacitor. The first inductor has a first terminal that is adapted to be coupled to a positive terminal of the power source to receive the DC input voltage therefrom, and a second terminal. The first switch has a first terminal that is coupled to the second terminal of the first inductor, a second terminal that is adapted to be coupled to a negative terminal of the power source, and a control terminal that is to receive the first control signal. The second switch has a first terminal that is coupled to the first terminal of the first inductor, a second terminal, and a control terminal that is to receive the second control signal. The second inductor is coupled between the second terminals of the first and second switches. The diode has an anode that is coupled to the second terminal of the first inductor, and a cathode. The capacitor has a first terminal that is coupled to the cathode of the diode, and a second terminal that is coupled to the second terminal of the second switch. A voltage across the capacitor serves as the DC intermediate voltage. The output circuit is coupled to the capacitor to receive the DC intermediate voltage therefrom, is to further receive a control input, and generates an alternating current (AC) output voltage based on the DC intermediate voltage and the control input.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
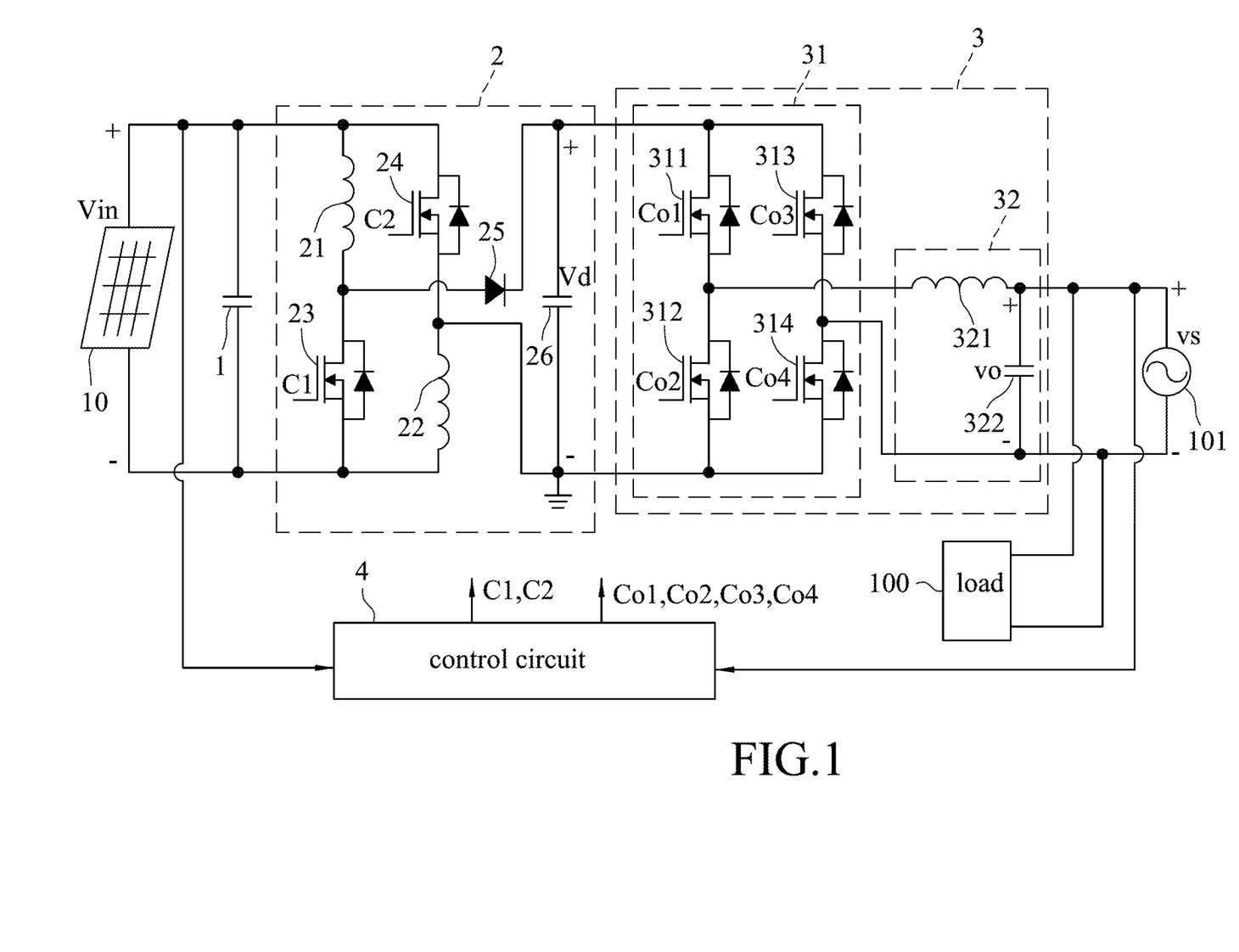
FIG. 1 is a circuit block diagram illustrating an embodiment of an inverter device according to the disclosure.

Referring to FIG. 1, an embodiment of an inverter device according to the disclosure is adapted to be coupled to a power source 10 (e.g., a photovoltaic module), a load 100 and a power grid 101, and converts direct current (DC) input power provided by the power source 10 into alternating current (AC) output power supplied to the load 100 and/or the power grid 101. The DC input power corresponds to a DC input voltage (Vin) and a DC input current. The AC output power corresponds to an AC output voltage (vo) and an AC output current. The inverter device of this embodiment can work over a wide range of DC input voltages (Vin), and includes an input capacitor 1, a converter circuit 2, an output circuit 3 and a control circuit 4.

The input capacitor 1 is adapted to be coupled to the power source 10 in parallel to receive the DC input voltage (Vin) therefrom, and filters out high frequency noises in the DC input voltage (Vin). The input capacitor 1 has a first terminal that is adapted to be coupled to a positive terminal of the power source 10, and a second terminal that is adapted to be coupled to a negative terminal of the power source 10.

The converter circuit 2 is coupled across the input capacitor 1 to receive the DC input voltage (Vin) therefrom, is to further receive a first control signal (C1) and a second control signal (C2), and generates a DC intermediate voltage (Vd) based on the DC input voltage (Vin) and the first and second control signals (C1, C2).

In this embodiment, the converter circuit 2 has a boost topology and a high voltage gain, and includes a first inductor 21, a first switch 23, a second switch 24, a second inductor 22, a diode 25 and a capacitor 26. The first inductor 21 has a first terminal that is coupled to the first terminal of the input capacitor 1 to receive the DC input voltage (Vin) therefrom, and a second terminal. The first switch 23 has a first terminal that is coupled to the second terminal of the first inductor 21, a second terminal that is coupled to the second terminal of the input capacitor 1, and a control terminal that is to receive the first control signal (C1). The second switch 24 has a first terminal that is coupled to the first terminal of the first inductor 21, a second terminal, and a control terminal that is to receive the second control signal (C2). The second inductor 22 is coupled between the second terminals of the first and second switches 23, 24. The diode 25 has an anode that is coupled to the second terminal of the first inductor 21, and a cathode. The capacitor 26 has a first terminal that is coupled to the cathode of the diode 25, and a second terminal that is coupled to the second terminal of the second switch 24. A voltage across the capacitor 26 serves as the DC intermediate voltage (Vd). In this embodiment, the capacitor 26 is a film capacitor that has a capacitance of, for example, 4.7 μF, and that is resistant to high temperature, a characteristic that is beneficial for enhancing reliability of the inverter device.

The output circuit 3 is coupled across the capacitor 26 to receive the DC intermediate voltage (Vd) therefrom, is adapted to be further coupled to the load 100 and the power grid 101, is to further receive a control input, and generates the AC output voltage (vo) for receipt by the load 100 and the power grid 101 based on the DC intermediate voltage (Vd) and the control input.

In this embodiment, the output circuit 3 includes an H-bridge 31 and a filter 32. The H-bridge 31 is coupled across the capacitor 26 to receive the DC intermediate voltage (Vd) therefrom, is to further receive the control input, and generates an AC intermediate voltage based on the DC intermediate voltage (Vd) and the control input. The filter 32 is coupled to the H-bridge 31 to receive the AC intermediate voltage therefrom, is adapted to be further coupled to the load 100 and the power grid 101, and filters the AC intermediate voltage to generate the AC output voltage (vo) for receipt by the load 100 and the power grid 101.

In this embodiment, the control input includes a first output control signal (Co1), a second output control signal (Co2), a third output control signal (Co3) and a fourth output control signal (Co4), and the H-bridge 31 includes a first output switch 311, a second output switch 312, a third output switch 313 and a fourth output switch 314. The first output switch 311 has a first terminal that is coupled to the first terminal of the capacitor 26 to receive the DC intermediate voltage (Vd) therefrom, a second terminal, and a control terminal that is to receive the first output control signal (Co1). The second output switch 312 has a first terminal that is coupled to the second terminal of the first output switch 311, a second terminal that is coupled to the second terminal of the capacitor 26, and a control terminal that is to receive the second output control signal (Co2). The third output switch 313 has a first terminal that is coupled to the first terminal of the first output switch 311, a second terminal, and a control terminal that is to receive the third output control signal (Co3). The fourth output switch 314 is coupled between the second terminals of the second and third output switches 312, 313, and has a control terminal that is to receive the fourth output control signal (Co4). The second terminals of the first and third output switches 311, 313 cooperatively provide the AC intermediate voltage.

In this embodiment, each of the first and second switches 23, 24 and the first to fourth output switches 311-314 is an N-type metal oxide semiconductor field effect transistor (nMOSFET) having a drain terminal, a source terminal and a gate terminal that respectively serve as the first, second and control terminals of the switch.

In this embodiment, the filter 32 includes an output inductor 321 and an output capacitor 322. The output inductor 321 has a first terminal and a second terminal. The output capacitor 322 has a first terminal that is coupled to the second terminal of the output inductor 321, and a second terminal. The output capacitor 322 is adapted to be further coupled to the load 100 and the power grid 101 in parallel. The first terminal of the output inductor 321 and the second terminal of the output capacitor 322 are respectively coupled to the second terminals of the first and third output switches 311, 313 to cooperatively receive the AC intermediate voltage therefrom. A voltage across the output capacitor 322 serves as the AC output voltage (vo). In this embodiment, the output capacitor 322 is a film capacitor.

The control circuit 4 is coupled to the input capacitor 1 to receive the DC input voltage (Vin) therefrom, is adapted to be further coupled to the power grid 101 to receive an AC grid voltage (vs) provided thereby, and is further coupled to the control terminals of the first and second switches 21, 22 and the first to fourth output switches 311-314. Based on the DC input voltage (Vin) and the AC grid voltage (vs), the control circuit 4 generates the first and second control signals (C1, C2) and the first to fourth output control signals (Co1-Co4) for receipt by the control terminals of the first and second switches 21, 22 and the first to fourth output switches 311-314. In this embodiment, the control circuit 4 performs pulse width modulation to generate the first and second control signals (C1, C2) and the first to fourth output control signals (Co1-Co4).

Figure 2:
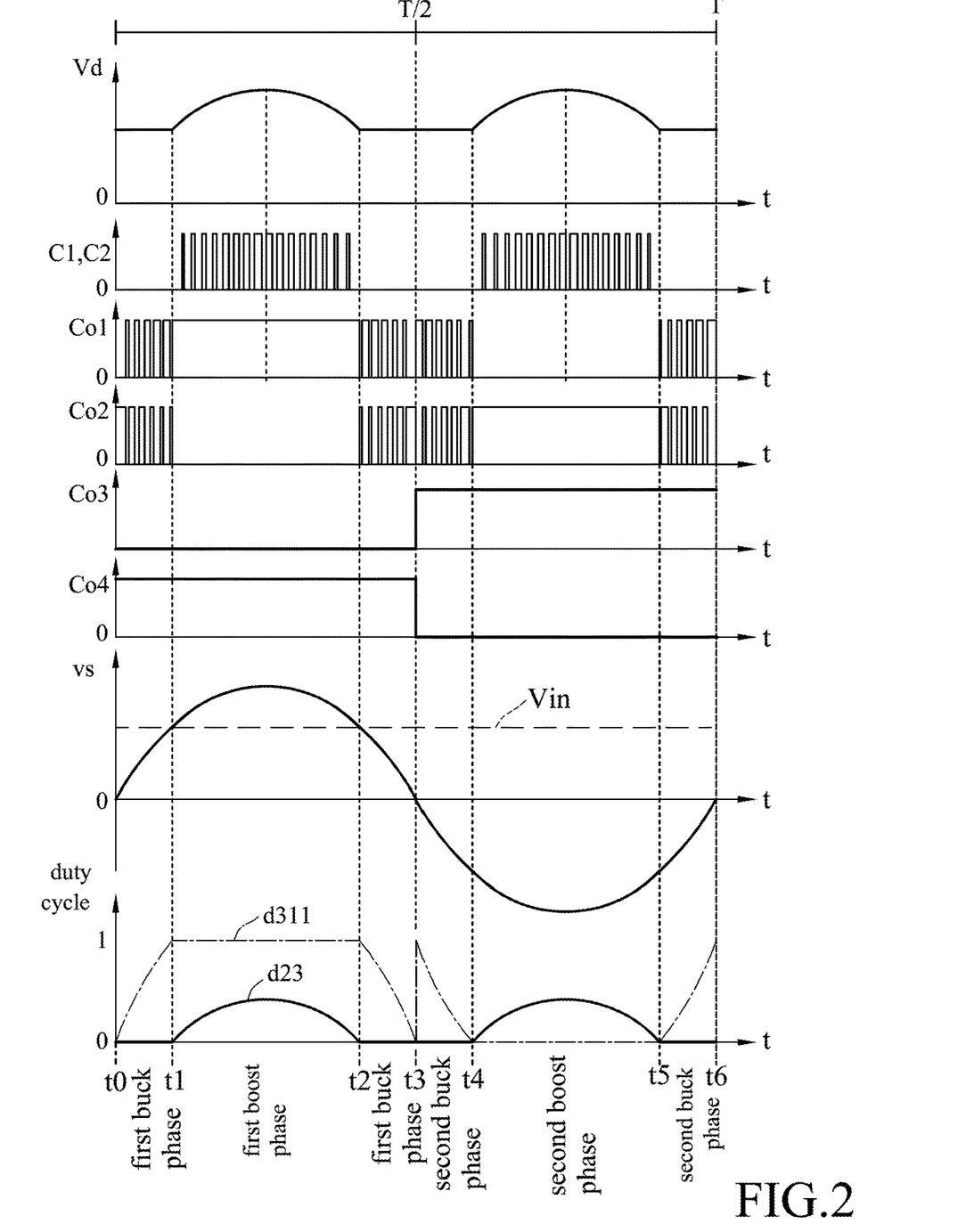
FIG. 2 is a timing diagram illustrating operations of the embodiment.

FIGS. 2 to 10 illustrate operations of the inverter device of this embodiment. In FIG. 2, the DC intermediate voltage (Vd), the first and second control signals (C1, C2), the first to fourth output control signals (Co1-Co4), the AC grid voltage (vs), a duty cycle (d23) of the first switch 23 and a duty cycle (d311) of the first output switch 311 are depicted. In FIGS. 3 to 10, the control circuit 4 (see FIG. 1) and the load 100 (see FIG. 1) are not depicted, conducting elements are depicted by solid lines, non-conducting elements are depicted by doted lines, and current flow is shown by dotted arrows.

In this embodiment, as shown in FIG. 2, the first and second control signals (C1, C2) are the same with each other, the first and second output control signals (Co1, Co2) are complementary to each other, and the third and fourth output control signals (Co3, Co4) are complementary to each other. In addition, the filter 32 is a low-pass filter, so the AC output voltage (vo) is substantially sinusoidal and is similar to the AC grid voltage (vs). The AC output current is also substantially sinusoidal, and is in-phase with the AC output voltage (vo) and the AC grid voltage (vs).

In this embodiment, the inverter device operates in a continuous conduction mode (CCM), and sequentially operates in a first buck phase, a first boost phase, the first buck phase, a second buck phase, a second boost phase and the second buck phase during each cycle of the AC grid voltage (vs). In a positive half cycle of the AC grid voltage (vs) from time t0 to time t3, the inverter device first operates in the first buck phase, enters the first boost phase when the AC grid voltage (vs) increases to become greater than the DC input voltage (Vin) at time t1, and enters the first buck phase again when the AC grid voltage (vs) decreases to become smaller than the DC input voltage (Vin) at time t2. In a negative half cycle of the AC grid voltage (vs) from time t3 to time t6, the inverter device first operates in the second buck phase, enters the second boost phase when an absolute value of the AC grid voltage (vs) increases to become greater than the DC input voltage (Vin) at time t4, and enters the second buck phase again when the absolute value of the AC grid voltage (vs) decreases to become smaller than the DC input voltage (Vin) at time t5.

Figure 3:
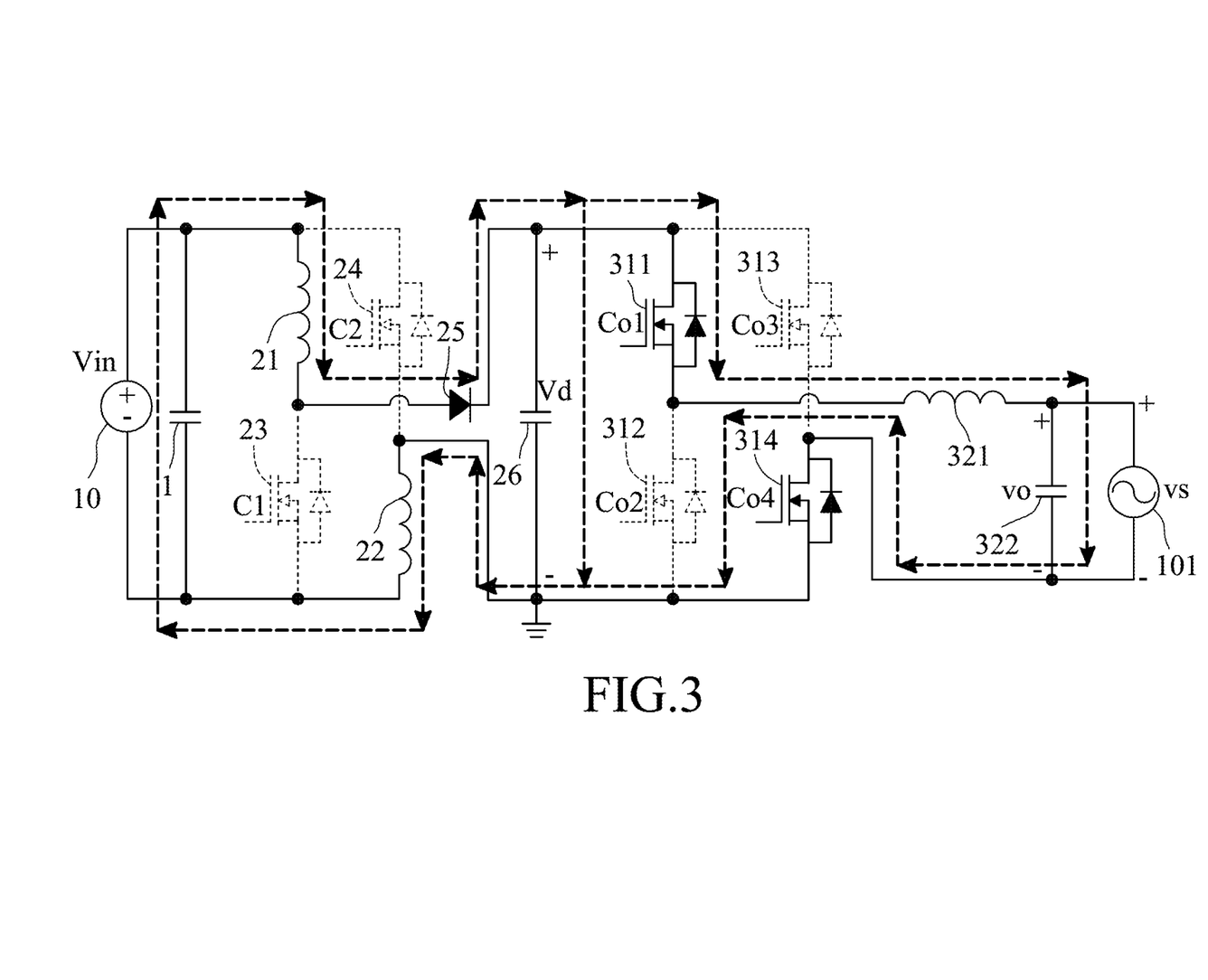
FIGS. 3 and 4 are equivalent circuit diagrams illustrating the embodiment operating in a first buck phase.
Figure 4:
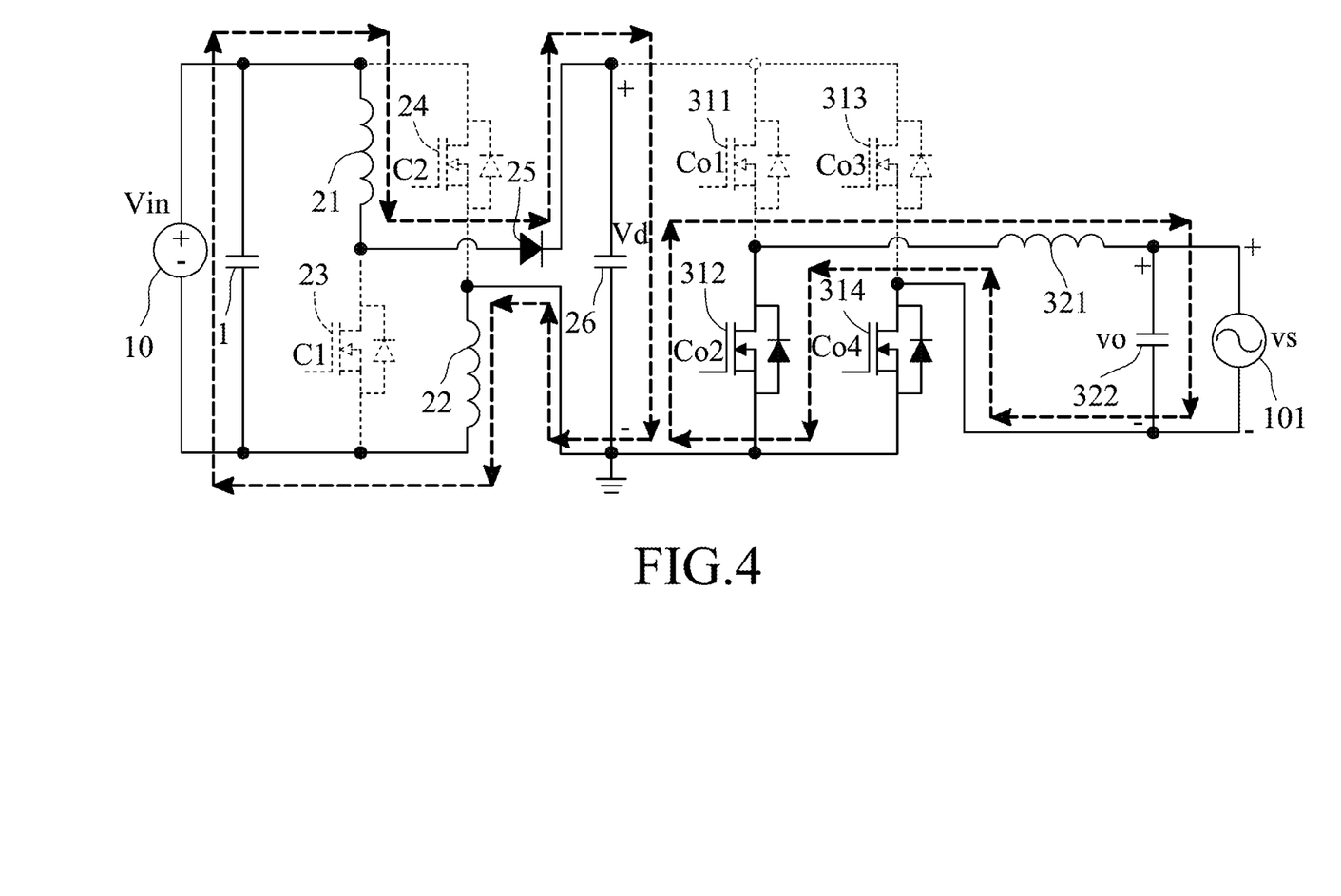

As shown in FIGS. 2, 3 and 4, in the first buck phase, the first and second control signals (C1, C2) and the third output control signal (Co3) are constantly in a logic low state, and the fourth output control signal (Co4) is constantly in a logic high state, so the first and second switches 23, 24 and the third output switch 313 are constantly in a non-conduction state, and the fourth output switch 314 is constantly in a conduction state. At this time, the diode 25 is constantly in the conduction state, and the first and second inductors 21, 22 are connected in series and cooperatively serve as an input filter. In addition, the first and second output control signals (Co1, Co2) transition between the logic low state and the logic high state at a high frequency (e.g., 20 KHz), so the first and second output switches 311, 312 transition between the non-conduction state and the conduction state at the high frequency. As shown in FIG. 3, when the first output switch 311 is in the conduction state while the second output switch 312 is in the non-conduction state, the output inductor 321 is charged by the power source 10 to store power, and there is power transmission from the power source 10 to the load 100 (see FIG. 1) and/or the power grid 101. As shown in FIG. 4, when the first output switch 311 is in the non-conduction state while the second output switch 312 is in the conduction state, the power stored in the output inductor 321 is released to the load 100 (see FIG. 1) and/or the power grid 101.

Figure 5:
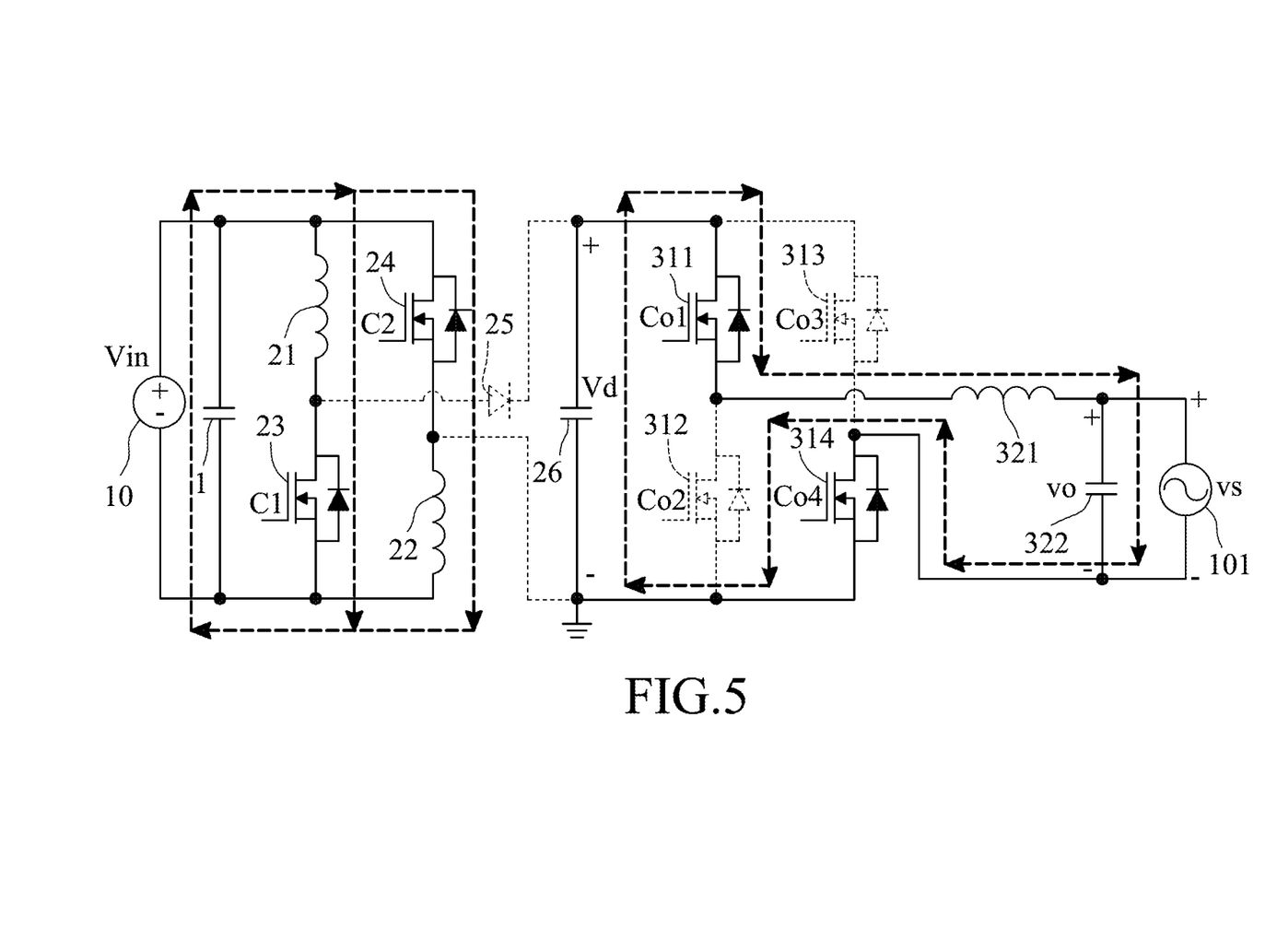
FIGS. 5 and 6 are equivalent circuit diagrams illustrating the embodiment operating in a first boost phase.
Figure 6:
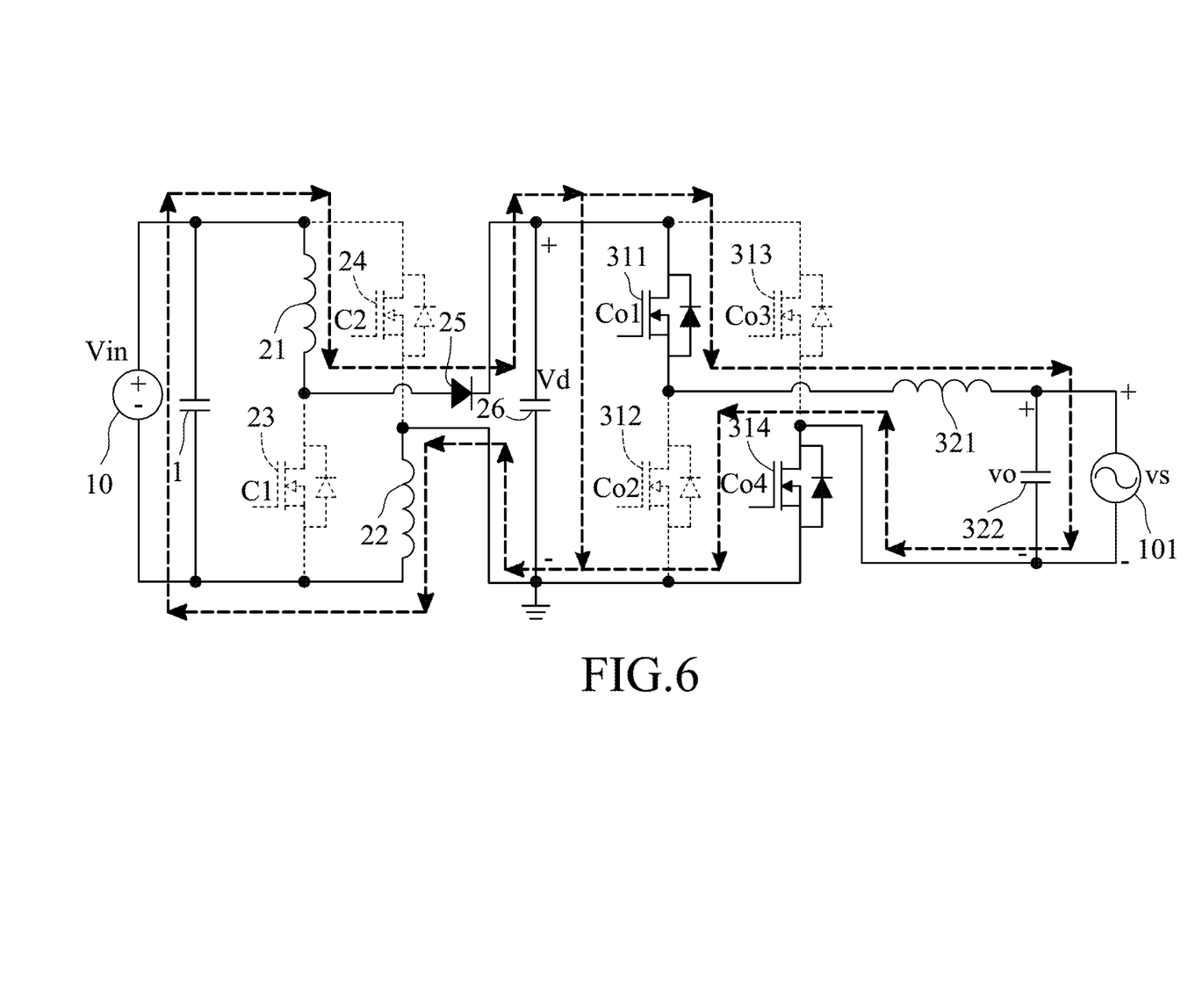

As shown in FIGS. 2, 5 and 6, in the first boost phase, the first and fourth output control signals (Co1, Co4) are constantly in the logic high state, and the second and third output control signals (Co2, Co3) are constantly in the logic low state, so the first and fourth output switches 311, 314 are constantly in the conduction state, and the second and third output switches 312, 313 are constantly in the non-conduction state. In addition, the first and second control signals (C1, C2) transition between the logic low state and the logic high state at the high frequency, so the first and second switches 23, 24 transition between the non-conduction state and the conduction state at the high frequency. As shown in FIG. 5, when both of the first and second switches 23, 24 are in the conduction state, the diode 25 is in the non-conduction state, the first and second inductors 21, 22 are connected in parallel and are charged by the power source 10 to store power, and the power stored in the capacitor 26 is released to the load 100 (see FIG. 1) and/or the power grid 101. As shown in FIG. 6, when both of the first and second switches 23, 24 are in the non-conduction state, the diode 25 is in the conduction state, the first and second inductors 21, 22 are connected in series, and the power stored in the first and second inductors 21, 22 is released to the capacitor 26 and further to the load 100 (see FIG. 1) and/or the power grid 101.

Figure 7:
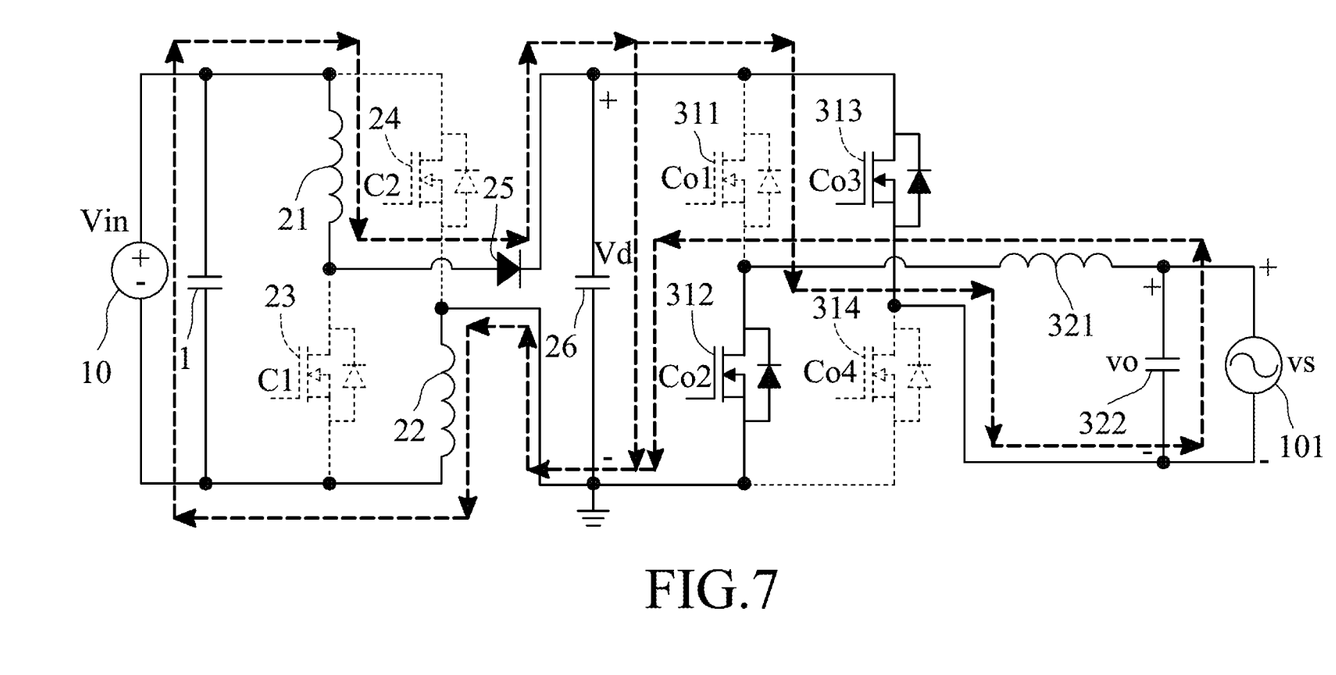
FIGS. 7 and 8 are equivalent circuit diagrams illustrating the embodiment operating in a second buck phase.
Figure 8:
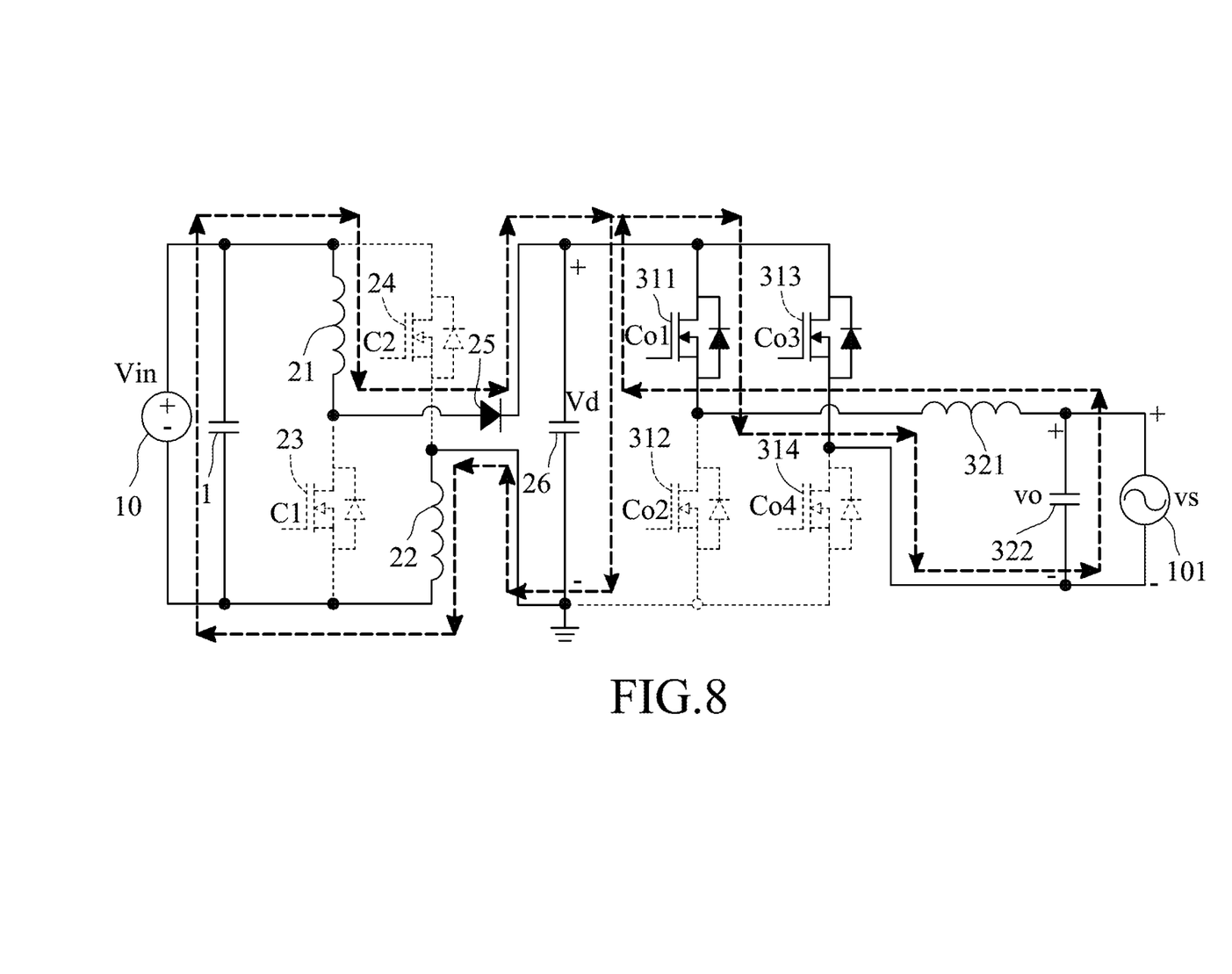

As shown in FIGS. 2, 7 and 8, in the second buck phase, the first and second control signals (C1, C2) and the fourth output control signal (Co4) are constantly in the logic low state, and the third output control signal (Co3) is constantly in a logic high state, so the first and second switches 23, 24 and the fourth output switch 314 are constantly in the non-conduction state, and the third output switch 313 is constantly in the conduction state. At this time, the diode 25 is constantly in the conduction state, and the first and second inductors 21, 22 are connected in series and cooperatively serve as an input filter. In addition, the first and second output control signals (Co1, Co2) transition between the logic low state and the logic high state at the high frequency, so the first and second output switches 311, 312 transition between the non-conduction state and the conduction state at the high frequency. As shown in FIG. 7, when the first output switch 311 is in the non-conduction state while the second output switch 312 is in the conduction state, the output inductor 321 is charged by the power source 10 to store power, and there is power transmission from the power source 10 to the load 100 (see FIG. 1) and/or the power grid 101. As shown in FIG. 8, when the first output switch 311 is in the conduction state while the second output switch 312 is in the non-conduction state, the power stored in the output inductor 321 is released to the load 100 (see FIG. 1) and/or the power grid 101.

Figure 9:
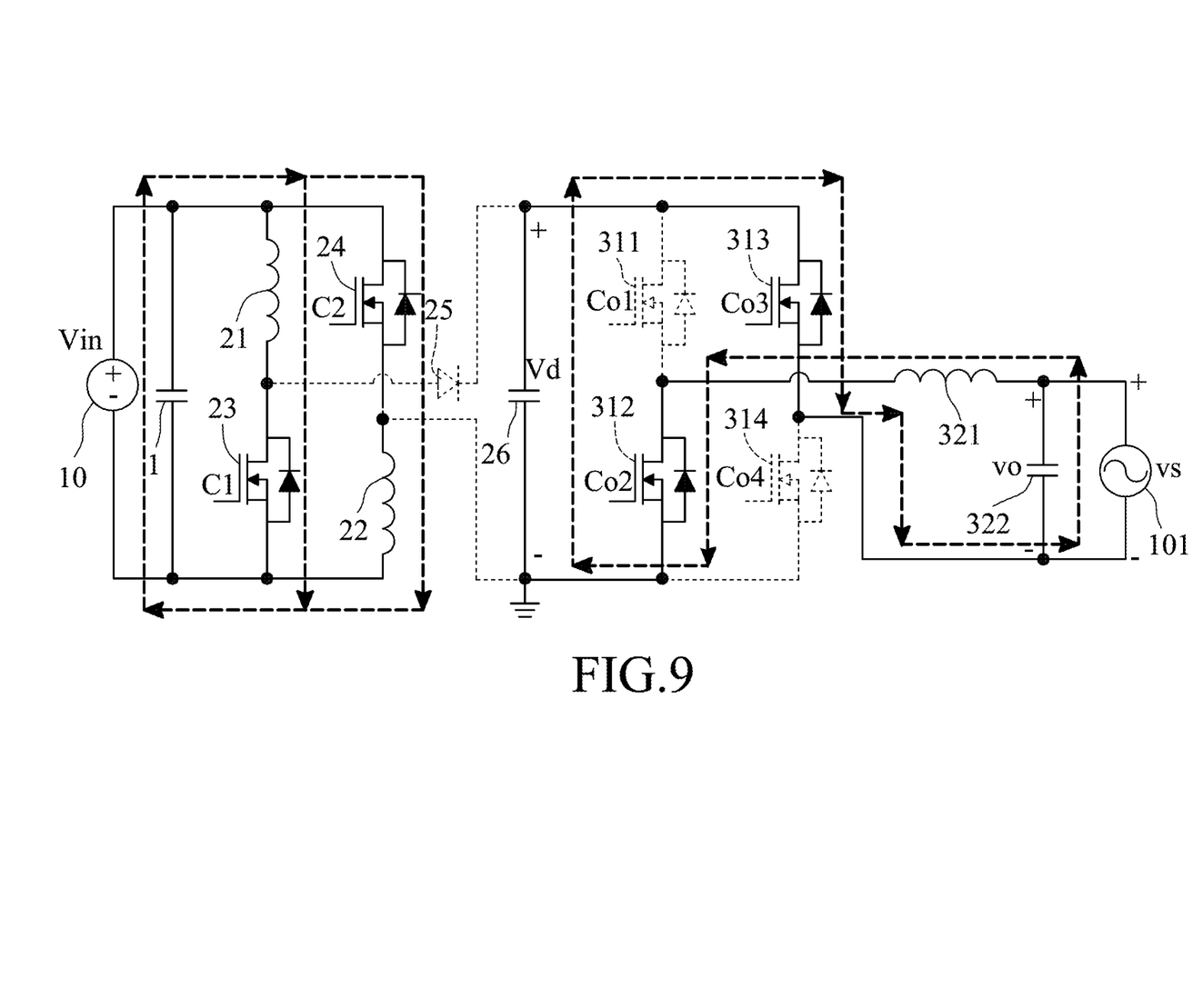
FIGS. 9 and 10 are equivalent circuit diagrams illustrating the embodiment operating in a second boost phase.
Figure 10:
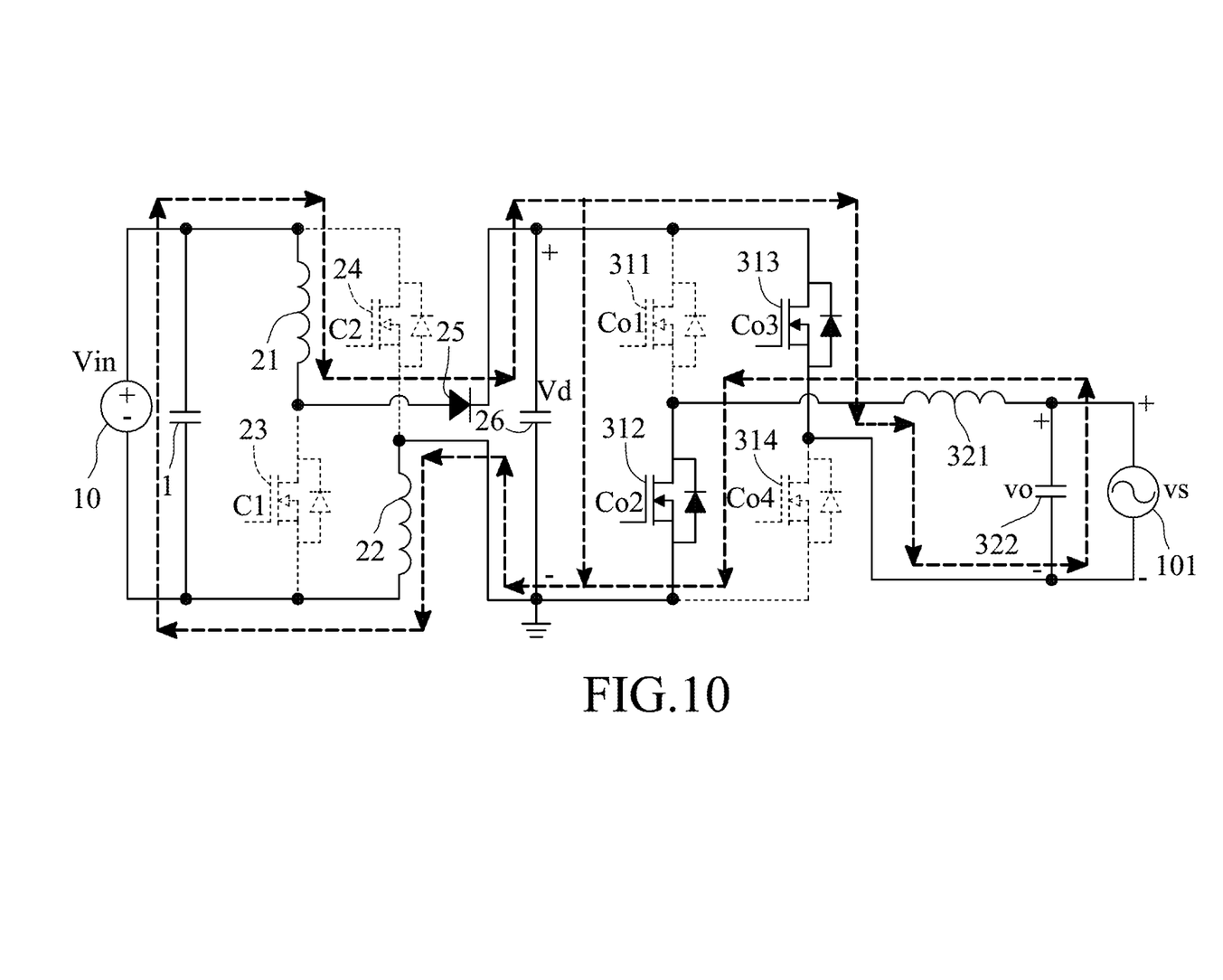

As shown in FIGS. 2, 9 and 10, in the second boost phase, the first and fourth output control signals (Co1, Co4) are constantly in the logic low state, and the second and third output control signals (Co2, Co3) are constantly in the logic high state, so the first and fourth output switches 311, 314 are constantly in the non-conduction state, and the second and third output switches 312, 313 are constantly in the conduction state. In addition, the first and second control signals (C1, C2) transition between the logic low state and the logic high state at the high frequency, so the first and second switches 23, 24 transition between the non-conduction state and the conduction state at the high frequency. As shown in FIG. 9, when both of the first and second switches 23, 24 are in the conduction state, the diode 25 is in the non-conduction state, the first and second inductors 21, 22 are connected in parallel and are charged by the power source 10 to store power, and the power stored in the capacitor 26 is released to the load 100 (see FIG. 1) and/or the power grid 101. As shown in FIG. 10, when both of the first and second switches 23, 24 are in the non-conduction state, the diode 25 is in the conduction state, the first and second inductors 21, 22 are connected in series, and the power stored in the first and second inductors 21, 22 is released to the capacitor 26 and further to the load 100 (see FIG. 1) and/or the power grid 101.

It should be noted that, in the first and second buck phases, the converter circuit 2 performs filtering and the output circuit 3 performs buck DC-to-AC conversion, and that, in the first and second boost phases, the converter circuit 2 performs boost DC-to-DC conversion and the output circuit 3 determines voltage polarity. In addition, in the first and second buck phases and the first and second boost phases, only the first and second switches 23, 24 of the converter circuit 2 or only the first and second output switches 311, 312 of the output circuit 3 operate at the high frequency (i.e., the inverter device of this embodiment performs single-stage power conversion), resulting in low switching loss and high power conversion efficiency of the inverter device.

Figure 11:
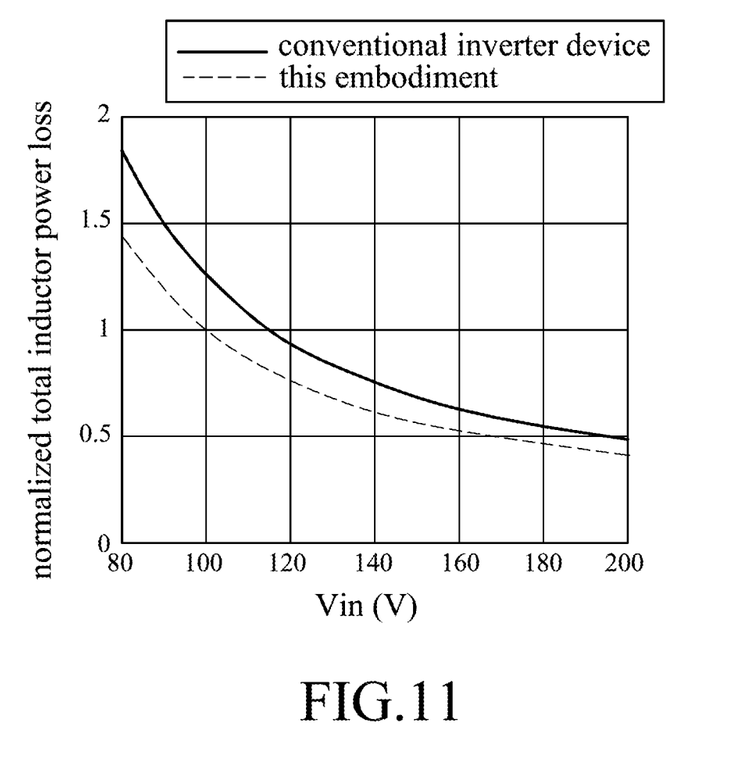
FIG. 11 is a plot illustrating normalized total inductor power loss versus direct current (DC) input voltage characteristic for the embodiment and a conventional inverter device.
Figure 12:
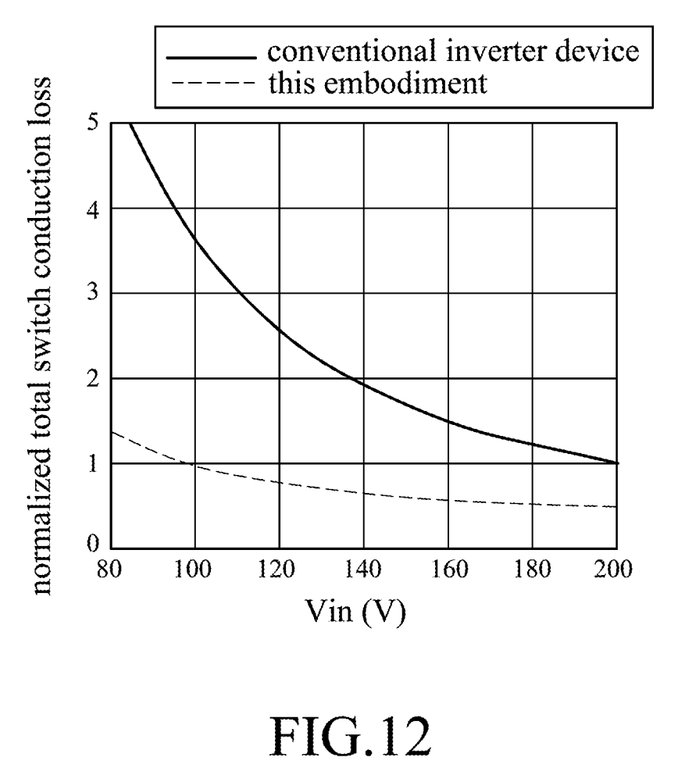
FIG. 12 is a plot illustrating normalized total switch conduction loss versus DC input voltage characteristic for the embodiment and the conventional inverter device.

FIG. 11 illustrates normalized total inductor power loss versus DC input voltage (Vin) characteristic for the inverter device of this embodiment and the conventional inverter device in a scenario where output power of the inverter device is 1 KW, the AC grid voltage (vs) is 220 Vrms, and the DC input voltage (Vin) falls within a range from 80V to 200V. FIG. 12 illustrates normalized total switch conduction loss versus DC input voltage (Vin) characteristic for the inverter device of this embodiment and the conventional inverter device in the aforesaid scenario. It can be reasonably determined from FIGS. 11 and 12 that, as compared to the conventional inverter device, the inverter device of this embodiment has lower total inductor power loss and lower total switch conduction loss.

Referring back to FIG. 1, in view of the above, the inverter device of this embodiment has the following advantages.

1. When both of the first and second switches 23, 24 are in the conduction state, the DC input current is equally distributed to the first and second switches 23, 24, and is equally distributed to the first and second inductors 21, 22. Therefore, the conduction loss of the first and second switches 23, 24 and the power loss of the first and second inductors 21, 22 can be reduced, thereby enhancing the power conversion efficiency of the inverter device.

2. In the first and second boost phases, the first and second inductors 21, 22 are charged to store power when they are connected in parallel, and release the power stored therein when they are connected in series, resulting in a high voltage gain and thus a high boost ratio of the inverter device.

3. In the first and second buck phases and the first and second boost phases, only the first and second switches 23, 24 of the converter circuit 2 or only the first and second output switches 311, 312 of the output circuit 3 operate at the high frequency (i.e., the inverter device of this embodiment performs single-stage power conversion), resulting in law power loss and thus high power conversion efficiency of the inverter device.

4. Each of the capacitor 26 and the output capacitor 322 is a film capacitor that is compact, cheap and resistant to high temperature. This can reduce occupied area and cost of the inverter device, and can enhance reliability of the inverter device.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. An inverter device comprising:
   a converter circuit adapted to be coupled to a power source to receive a direct current (DC) input voltage therefrom, to further receive a first control signal and a second control signal, and generating a DC intermediate voltage based on the DC input voltage and the first and second control signals, said converter circuit including
   a first inductor having a first terminal that is adapted to be coupled to a positive terminal of the power source to receive the DC input voltage therefrom, and a second terminal,
   a first switch having a first terminal that is coupled to said second terminal of said first inductor, a second terminal that is adapted to be coupled to a negative terminal of the power source, and a control terminal that is to receive the first control signal,
   a second switch having a first terminal that is coupled to said first terminal of said first inductor, a second terminal, and a control terminal that is to receive the second control signal,
   a second inductor is coupled between said second terminals of said first and second switches,
   a diode having an anode that is coupled to said second terminal of said first inductor, and a cathode, and
   a capacitor having a first terminal that is coupled to said cathode of said diode, and a second terminal that is coupled to said second terminal of said second switch, a voltage across said capacitor serving as the DC intermediate voltage; and
   an output circuit coupled to said capacitor to receive the DC intermediate voltage therefrom, to further receive a control input, and generating an alternating current (AC) output voltage based on the DC intermediate voltage and the control input.

2. The inverter device of claim 1, wherein:
   the first and second control signals are the same with each other;
   the control input includes a first output control signal and a second output control signal that are complementary to each other, and a third output control signal and a fourth output control signal that are complementary to each other;
   said inverter device operates in a plurality of phases that include a first buck phase and a second buck phase;
   in the first buck phase, the first control signal and the third output control signal are in a logic low state, and the first output control signal transitions between the logic low state and a logic high state;
   in the second buck phase, the first control signal and the fourth output control signal are in the logic low state, and the first output control signal transitions between the logic low state and the logic high state.

3. The inverter device of claim 2, wherein:
   the phases further include a first boost phase and a second boost phase;
   in the first boost phase, the first control signal transitions between the logic low state and the logic high state, and the first and fourth output control signals are in the logic high state;
   in the second buck phase, the first control signal transitions between the logic low state and the logic high state, and the first and fourth output control signals are in the logic low state.

4. The inverter device of claim 1, wherein the capacitor is a film capacitor.

5. The inverter device of claim 1, wherein said output circuit includes:
   an H-bridge coupled to said capacitor to receive the DC intermediate voltage therefrom, to further receive the control input, and generating an AC intermediate voltage based on the DC intermediate voltage and the control input; and a filter coupled to said H-bridge to receive the AC intermediate voltage therefrom, and filtering the AC intermediate voltage to generate the AC output voltage.

6. The inverter device of claim 5, wherein said filter includes:
an output inductor having a first terminal and a second terminal; and
an output capacitor having a first terminal that is coupled to said second terminal of said output inductor, and a second terminal;
said first terminal of said output inductor and said second terminal of said output capacitor being coupled to said H-bridge to cooperatively receive the AC intermediate voltage therefrom;
a voltage across said output capacitor serving as the AC output voltage.

7. The inverter device of claim 5, wherein the control input includes a first output control signal, a second output control signal, a third output control signal and a fourth output control signal, and said H-bridge includes:
a first output switch having a first terminal that is coupled to said first terminal of said capacitor to receive the DC intermediate voltage therefrom, a second terminal that is coupled to said filter, and a control terminal that is to receive the first output control signal;
a second output switch having a first terminal that is coupled to said second terminal of said first output switch, a second terminal that is coupled to said second terminal of said capacitor, and a control terminal that is to receive the second output control signal;
a third output switch having a first terminal that is coupled to said first terminal of said first output switch, a second terminal that is coupled to said filter, and a control terminal that is to receive the third output control signal; and
a fourth output switch coupled between said second terminals of said second and third output switches, and having a control terminal that is to receive the fourth output control signal;
said second terminals of said first and third output switches cooperatively providing the AC intermediate voltage.

8. The inverter device of claim 1, further comprising:
a control circuit adapted to be coupled to the power source to receive the DC input voltage therefrom, adapted to further receive an AC grid voltage, and further coupled to said control terminals of said first and second switches and said output circuit;
based on the DC input voltage and the AC grid voltage, said control circuit generating the first and second control signals and the control input for receipt by said control terminals of said first and second switches and said output circuit.

9. The inverter device of claim 8, wherein:
the first and second control signals are the same with each other;
the control input includes a first output control signal and a second output control signal that are complementary to each other, and a third output control signal and a fourth output control signal that are complementary to each other;
in a positive half cycle of the AC grid voltage,
when the AC grid voltage is smaller than the DC input voltage, the first control signal and the third output control signal are in a logic low state, and the first output control signal transitions between the logic low state and a logic high state, and
when the AC grid voltage is greater than the DC input voltage, the first control signal transitions between the logic low state and the logic high state, and the first and fourth output control signals are in the logic high state.

10. The inverter device of claim 8, wherein:
the first and second control signals are the same with each other;
the control input includes a first output control signal and a second output control signal that are complementary to each other, and a third output control signal and a fourth output control signal that are complementary to each other;
in a negative half cycle of the AC grid voltage,
when an absolute value of the AC grid voltage is smaller than the DC input voltage, the first control signal and the fourth output control signal are in a logic low state, and the first output control signal transitions between the logic low state and a logic high state, and
when the absolute value of the AC grid voltage is greater than the DC input voltage, the first control signal transitions between the logic low state and the logic high state, and the first and fourth output control signals are in the logic low state.

* * * * *